US012057979B2

(12) United States Patent
Harada et al.

(10) Patent No.: US 12,057,979 B2
(45) Date of Patent: Aug. 6, 2024

(54) TERMINAL

(71) Applicant: NTT DOCOMO, INC., Tokyo (JP)

(72) Inventors: Hiroki Harada, Tokyo (JP); Satoshi Nagata, Tokyo (JP); Wenjia Liu, Beijing (CN); Xiaolin Hou, Beijing (CN); Juan Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/597,662

(22) PCT Filed: Jul. 18, 2019

(86) PCT No.: PCT/JP2019/028324
§ 371 (c)(1),
(2) Date: Jan. 17, 2022

(87) PCT Pub. No.: WO2021/009918
PCT Pub. Date: Jan. 21, 2021

(65) Prior Publication Data
US 2022/0263698 A1 Aug. 18, 2022

(51) Int. Cl.
*H04L 27/26* (2006.01)
*H04L 1/00* (2006.01)

(52) U.S. Cl.
CPC ...... *H04L 27/26025* (2021.01); *H04L 1/0002* (2013.01); *H04L 1/0014* (2013.01); *H04L 27/2614* (2013.01)

(58) Field of Classification Search
CPC ............ H04L 27/26025; H04L 1/0002; H04L 1/0003; H04L 1/0009; H04L 1/0014; H04L 1/0016; H04L 1/0023; H04L 27/2614

See application file for complete search history.

(56) References Cited

U.S. PATENT DOCUMENTS

| | | | |
|---|---|---|---|
| 11,184,903 B1* | 11/2021 | Lin | H04L 1/0003 |
| 11,451,280 B2* | 9/2022 | Song | H04L 5/001 |
| 2017/0288808 A1 | 10/2017 | Blankenship et al. | |
| 2020/0106574 A1 | 4/2020 | Lee et al. | |
| 2020/0366406 A1 | 11/2020 | Kim et al. | |
| 2020/0366441 A1* | 11/2020 | Park | H04L 5/0053 |

FOREIGN PATENT DOCUMENTS

| | | |
|---|---|---|
| EP | 3 410 619 A1 | 12/2018 |
| EP | 3 605 891 A1 | 2/2020 |
| JP | H07-162393 A | 6/1995 |
| WO | 2017/130505 A1 | 8/2017 |
| WO | 2018/173466 A1 | 9/2018 |

(Continued)

OTHER PUBLICATIONS

Extended European Search Report issued in European Application No. 19937974.4, dated Jan. 5, 2023 (8 pages).

(Continued)

*Primary Examiner* — Betsy Deppe
(74) *Attorney, Agent, or Firm* — Osha Bergman Watanabe & Burton LLP

(57) ABSTRACT

A terminal determines a target code rate by using a reference code rate, which is based on a modulation scheme and a modulation order, and an adjustment coefficient α that lowers the reference code rate. The terminal transmits/receives a signal encoded based on the target code rate.

3 Claims, 18 Drawing Sheets

(56) References Cited

FOREIGN PATENT DOCUMENTS

WO        2018236078 A1    12/2018
WO        2019098747 A1    5/2019

OTHER PUBLICATIONS

3GPP TS 38.214 V15.6.0; "3rd Generation Partnership Project; Technical Specification Group Radio Access Network; NR; Physical layer procedures for data (Release 15)"; Jun. 2019 (105 pages).
H. Lin et al; "An Efficient FTN Implementation of the OFDM/OQAM System"; 2015 IEEE International Conference on Communication (ICC), pp. 4787-4792; Sep. 10, 2015 (6 pages).
International Search Report for corresponding International Application No. PCT/JP2019/028324, mailed Sep. 10, 2019 (5 pages).
Written Opinion for corresponding International Application No. PCT/JP2019/028324, mailed Sep. 10, 2019 (4 pages).

* cited by examiner

FIG. 5

Example: New Table 5.1.3.1-2: MCS index table 2 for PDSCH

| MCS Index $I_{MCS}$ | Modulation Order $Q_m$ | Target code Rate R x [1024] | Squeezing factor $\alpha$ | Spectral efficiency |
|---|---|---|---|---|
| 0 | 2 | 120 | | 0.2344 |
| 1 | 2 | 193 | | 0.3770 |
| 2 | 2 | 308 | | 0.6016 |
| 3 | 2 | 449 | | 0.8770 |
| 4 | 2 | 602 | | 1.1758 |
| 5 | 4 | 378 | | 1.4766 |
| 6 | 4 | 434 | | 1.6953 |
| 7 | 4 | 490 | | 1.9141 |
| 8 | 4 | 553 | | 2.1602 |
| 9 | 4 | 616 | | 2.4063 |
| 10 | 4 | 658 | | 2.5703 |

FIG. 6

| MCS Index $I_{MCS}$ | Modulation Order $Q_m$ | Target code Rate R x [1024] | Squeezing factor $\alpha$ | Spectral efficiency |
|---|---|---|---|---|
| 0 | 2 | 120 | 1 | 0.2344 |
| 1 | 2 | 193 | 1 | 0.3770 |
| 2 | 2 | 308 | 1 | 0.6016 |
| 3 | 2 | 277 | 0.9 | 0.6016 |
| 4 | 2 | 154 | 0.5 | 0.6016 |
| 5 | 2 | 449 | 1 | 0.8770 |
| 6 | 2 | 404 | 0.9 | 0.8870 |
| 7 | 2 | 337 | 0.75 | 0.8870 |
| 8 | 2 | 224 | 0.5 | 0.8870 |
| 9 | 2 | 602 | 1 | 1.1758 |
| 10 | 2 | 541 | 0.9 | 1.1758 |
| 11 | 2 | 451 | 0.75 | 1.1758 |
| 12 | 2 | 301 | 0.5 | 1.1758 |
| 13 | 4 | 378 | 1 | 1.4766 |
| 14 | 4 | 340 | 0.9 | 1.4766 |
| 15 | 4 | 283 | 0.75 | 1.4766 |
| 16 | 4 | 434 | 1 | 1.6953 |
| 17 | 4 | 391 | 0.9 | 1.6953 |
| 18 | 4 | 325 | 0.75 | 1.6953 |
| 19 | 4 | 490 | 1 | 1.9141 |
| 20 | 4 | 441 | 0.9 | 1.9141 |
| 21 | 4 | 367 | 0.75 | 1.9141 |
| 22 | 4 | 553 | 1 | 2.1602 |
| 23 | 4 | 498 | 0.9 | 2.1602 |
| 24 | 4 | 415 | 0.75 | 2.1602 |
| 25 | 4 | 616 | 1 | 2.4063 |
| 26 | 4 | 554 | 0.9 | 2.4063 |
| 27 | 4 | 462 | 0.75 | 2.4063 |
| 28 | 4 | 658 | 1 | 2.5703 |
| 29 | 4 | 592 | 0.9 | 2.5703 |
| 30 | 4 | 493 | 0.75 | 2.5703 |
| 31 | 6 | 466 | 1 | 2.7305 |
| 32 | 6 | 420 | 0.9 | 2.7305 |
| 33 | 6 | 517 | 1 | 3.0293 |
| 34 | 6 | 465 | 0.9 | 3.0293 |
| 35 | 6 | 567 | 1 | 3.3223 |
| 36 | 6 | 510 | 0.9 | 3.3223 |
| 37 | 6 | 616 | 1 | 3.6094 |
| 38 | 6 | 554 | 0.9 | 3.6094 |
| 39 | 6 | 666 | 1 | 3.9023 |
| 40 | 6 | 599 | 0.9 | 3.9023 |
| 41 | 6 | 719 | 1 | 4.2129 |
| 42 | 6 | 647 | 0.9 | 4.2129 |
| 43 | 6 | 772 | 1 | 4.5234 |
| 44 | 6 | 695 | 0.9 | 4.5234 |
| 45 | 6 | 822 | 1 | 4.8164 |
| 46 | 6 | 740 | 0.9 | 4.8164 |
| 47 | 6 | 873 | 1 | 5.1152 |
| 48 | 6 | 786 | 0.9 | 5.1152 |
| 49 | 8 | 682.5 | 1 | 5.3320 |
| 50 | 8 | 711 | 1 | 5.5547 |
| 51 | 8 | 754 | 1 | 5.8906 |
| 52 | 8 | 797 | 1 | 6.2266 |
| 53 | 8 | 841 | 1 | 6.5703 |
| 54 | 8 | 885 | 1 | 6.9141 |
| 55 | 8 | 916.5 | 1 | 7.1602 |
| 56 | 8 | 948 | 1 | 7.4063 |

FIG. 7

| MCS Index $I_{MCS}$ | Modulation Order $Q_m$ | Target code Rate R x [1024] | Squeezing factor $\alpha$ | Spectral efficiency |
|---|---|---|---|---|
| 0 | 2 | 120 | 1 | 0.2344 |
| 1 | 2 | 193 | 1 | 0.3770 |
| 2 | 2 | 154 | 0.5 | 0.6016 |
| 3 | 2 | 224 | 0.5 | 0.8870 |
| 4 | 2 | 301 | 0.5 | 1.1758 |
| 5 | 4 | 283 | 0.75 | 1.4766 |
| 6 | 4 | 325 | 0.75 | 1.6953 |
| 7 | 4 | 367 | 0.75 | 1.9141 |
| 8 | 4 | 415 | 0.75 | 2.1602 |
| 9 | 4 | 462 | 0.75 | 2.4063 |
| 10 | 4 | 493 | 0.75 | 2.5703 |
| 11 | 6 | 420 | 0.9 | 2.7305 |
| 12 | 6 | 465 | 0.9 | 3.0293 |
| 13 | 6 | 510 | 0.9 | 3.3223 |
| 14 | 6 | 554 | 0.9 | 3.6094 |
| 15 | 6 | 599 | 0.9 | 3.9023 |
| 16 | 6 | 647 | 0.9 | 4.2129 |
| 17 | 6 | 695 | 0.9 | 4.5234 |
| 18 | 6 | 740 | 0.9 | 4.8164 |
| 19 | 6 | 786 | 0.9 | 5.1152 |
| 20 | 8 | 682.5 | 1 | 5.3320 |
| 21 | 8 | 711 | 1 | 5.5547 |
| 22 | 8 | 754 | 1 | 5.8906 |
| 23 | 8 | 797 | 1 | 6.2266 |
| 24 | 8 | 841 | 1 | 6.5703 |
| 25 | 8 | 885 | 1 | 6.9141 |
| 26 | 8 | 916.5 | 1 | 7.1602 |
| 27 | 8 | 948 | 1 | 7.4063 |
| 28 | 2 | | | reserved |
| 29 | 4 | | | reserved |
| 30 | 6 | | | reserved |
| 31 | 8 | | | reserved |

FIG. 8

| MCS Index $I_{MCS}$ | Modulation Order $Q_m$ | Target code Rate R x [1024] | Squeezing factor $\alpha$ | Spectral efficiency |
|---|---|---|---|---|
| 0 | 2 | 120 | 1 | 0.2344 |
| 1 | 2 | 193 | 1 | 0.3770 |
| 2 | 2 | 308 | 1 | 0.6016 |
| 3 | 2 | 449 | 1 | 0.8770 |
| 4 | 2 | 602 | 1 | 1.1758 |
| 5 | 4 | 378 | 1 | 1.4766 |
| 6 | 2 | 378 | 0.5 | 1.4766 |
| 7 | 4 | 434 | 1 | 1.6953 |
| 8 | 2 | 434 | 0.5 | 1.6953 |
| 9 | 4 | 490 | 1 | 1.9141 |
| 10 | 2 | 490 | 0.5 | 1.9141 |
| 11 | 4 | 553 | 1 | 2.1602 |
| 12 | 2 | 553 | 0.5 | 2.1602 |
| 13 | 4 | 616 | 1 | 2.4063 |
| 14 | 2 | 616 | 0.5 | 2.4063 |
| 15 | 4 | 658 | 1 | 2.5703 |
| 16 | 2 | 658 | 0.5 | 2.5703 |
| 17 | 6 | 466 | 1 | 2.7305 |
| 18 | 4 | 466 | 2/3 | 2.7305 |
| 19 | 6 | 517 | 1 | 3.0293 |
| 20 | 4 | 517 | 2/3 | 3.0293 |
| 21 | 6 | 567 | 1 | 3.3223 |
| 22 | 4 | 567 | 2/3 | 3.3223 |
| 23 | 6 | 616 | 1 | 3.6094 |
| 24 | 4 | 616 | 2/3 | 3.6094 |
| 25 | 6 | 666 | 1 | 3.9023 |
| 26 | 4 | 666 | 2/3 | 3.9023 |
| 27 | 6 | 719 | 1 | 4.2129 |
| 28 | 4 | 719 | 2/3 | 4.2129 |
| 29 | 6 | 772 | 1 | 4.5234 |
| 30 | 4 | 772 | 2/3 | 4.5234 |
| 31 | 6 | 822 | 1 | 4.8164 |
| 32 | 4 | 822 | 2/3 | 4.8164 |
| 33 | 6 | 873 | 1 | 5.1152 |
| 34 | 4 | 873 | 2/3 | 5.1152 |
| 35 | 8 | 682.5 | 1 | 5.3320 |
| 36 | 4 | 682.5 | 1/2 | 5.3320 |
| 37 | 6 | 682.5 | 3/4 | 5.3320 |
| 38 | 8 | 711 | 1 | 5.5547 |
| 39 | 4 | 711 | 1/2 | 5.5547 |
| 40 | 6 | 711 | 3/4 | 5.5547 |
| 41 | 8 | 754 | 1 | 5.8906 |
| 42 | 4 | 754 | 1/2 | 5.8906 |
| 43 | 6 | 754 | 3/4 | 5.8906 |
| 44 | 8 | 797 | 1 | 6.2266 |
| 45 | 4 | 797 | 1/2 | 6.2266 |
| 46 | 6 | 797 | 3/4 | 6.2266 |
| 47 | 8 | 841 | 1 | 6.5703 |
| 48 | 4 | 841 | 1/2 | 6.5703 |
| 49 | 6 | 841 | 3/4 | 6.5703 |
| 50 | 8 | 885 | 1 | 6.9141 |
| 51 | 4 | 885 | 1/2 | 6.9141 |
| 52 | 6 | 885 | 3/4 | 6.9141 |
| 53 | 8 | 916.5 | 1 | 7.1602 |
| 54 | 4 | 916.5 | 1/2 | 7.1602 |
| 55 | 6 | 916.5 | 3/4 | 7.1602 |
| 56 | 8 | 948 | 1 | 7.4063 |
| 57 | 4 | 948 | 1/2 | 7.4063 |
| 68 | 6 | 948 | 3/4 | 7.4063 |

FIG. 9

| MCS Index $I_{MCS}$ | Modulation Order $Q_m$ | Target code Rate R x [1024] | Squeezing factor $\alpha$ | Spectral efficiency |
|---|---|---|---|---|
| 0 | 2 | 120 | 1 | 0.2344 |
| 1 | 2 | 193 | 1 | 0.3770 |
| 2 | 2 | 308 | 1 | 0.6016 |
| 3 | 2 | 449 | 1 | 0.8770 |
| 4 | 2 | 602 | 1 | 1.1758 |
| 5 | 2 | 378 | 0.5 | 1.4766 |
| 6 | 2 | 434 | 0.5 | 1.6953 |
| 7 | 2 | 490 | 0.5 | 1.9141 |
| 8 | 2 | 553 | 0.5 | 2.1602 |
| 9 | 2 | 616 | 0.5 | 2.4063 |
| 10 | 2 | 658 | 0.5 | 2.5703 |
| 11 | 4 | 466 | 2/3 | 2.7305 |
| 12 | 4 | 517 | 2/3 | 3.0293 |
| 13 | 4 | 567 | 2/3 | 3.3223 |
| 14 | 4 | 616 | 2/3 | 3.6094 |
| 15 | 4 | 666 | 2/3 | 3.9023 |
| 16 | 4 | 719 | 2/3 | 4.2129 |
| 17 | 4 | 772 | 2/3 | 4.5234 |
| 18 | 4 | 822 | 2/3 | 4.8164 |
| 19 | 4 | 873 | 2/3 | 5.1152 |
| 20 | 6 | 682.5 | 3/4 | 5.3320 |
| 21 | 6 | 711 | 3/4 | 5.5547 |
| 22 | 6 | 754 | 3/4 | 5.8906 |
| 23 | 6 | 797 | 3/4 | 6.2266 |
| 24 | 6 | 841 | 3/4 | 6.5703 |
| 25 | 6 | 885 | 3/4 | 6.9141 |
| 26 | 6 | 916.5 | 3/4 | 7.1602 |
| 27 | 6 | 948 | 3/4 | 7.4063 |
| 28 | 2 | | reserved | |
| 29 | 4 | | reserved | |
| 30 | 6 | | reserved | |
| 31 | 8 | | reserved | |

FIG. 10

| MCS Index $I_{MCS}$ | Modulation Order $Q_m$ | Target code Rate R x [1024] | Squeezing factor α | Spectral efficiency |
|---|---|---|---|---|
| 0 | 2 | 120 | 1 | 0.2344 |
| 1 | 2 | 120 | 0.75 | 0.3125 |
| 2 | 2 | 120 | 0.5 | 0.4688 |
| 3 | 2 | 193 | 1 | 0.3770 |
| 4 | 2 | 193 | 0.75 | 0.5027 |
| 5 | 2 | 193 | 0.5 | 0.7540 |
| 6 | 2 | 308 | 1 | 0.6016 |
| 7 | 2 | 308 | 0.75 | 0.8021 |
| 8 | 2 | 308 | 0.5 | 1.2032 |
| 9 | 2 | 449 | 1 | 0.8770 |
| 10 | 2 | 449 | 0.75 | 1.1693 |
| 11 | 2 | 449 | 0.5 | 1.7540 |
| 12 | 2 | 602 | 1 | 1.1758 |
| 13 | 2 | 602 | 0.75 | 1.5677 |
| 14 | 2 | 602 | 0.5 | 2.3516 |
| 15 | 4 | 378 | 1 | 1.4766 |
| 16 | 4 | 378 | 0.75 | 1.9688 |
| 17 | 4 | 434 | 1 | 1.6953 |
| 18 | 4 | 434 | 0.75 | 2.2604 |
| 19 | 4 | 490 | 1 | 1.9141 |
| 20 | 4 | 490 | 0.75 | 2.5521 |
| 21 | 4 | 553 | 1 | 2.1602 |
| 22 | 4 | 553 | 0.75 | 2.8803 |
| 23 | 4 | 616 | 1 | 2.4063 |
| 24 | 4 | 616 | 0.75 | 3.2084 |
| 25 | 4 | 658 | 1 | 2.5703 |
| 26 | 4 | 658 | 0.75 | 3.4271 |
| 27 | 6 | 466 | 1 | 2.7305 |
| 28 | 6 | 466 | 0.9 | 3.0339 |
| 29 | 6 | 517 | 1 | 3.0293 |
| 30 | 6 | 517 | 0.9 | 3.3659 |
| 31 | 6 | 567 | 1 | 3.3223 |
| 32 | 6 | 567 | 0.9 | 3.6914 |
| 33 | 6 | 616 | 1 | 3.6094 |
| 34 | 6 | 616 | 0.9 | 4.0104 |
| 35 | 6 | 666 | 1 | 3.9023 |
| 36 | 6 | 666 | 0.9 | 4.3359 |
| 37 | 6 | 719 | 1 | 4.2129 |
| 38 | 6 | 719 | 0.9 | 4.6810 |
| 39 | 6 | 772 | 1 | 4.5234 |
| 40 | 6 | 772 | 0.9 | 5.0260 |
| 41 | 6 | 822 | 1 | 4.8164 |
| 42 | 6 | 822 | 0.9 | 5.3516 |
| 43 | 6 | 873 | 1 | 5.1152 |
| 44 | 6 | 873 | 0.9 | 5.6836 |
| 45 | 8 | 682.5 | 1 | 5.3320 |
| 46 | 8 | 711 | 1 | 5.5547 |
| 47 | 8 | 754 | 1 | 5.8906 |
| 48 | 8 | 797 | 1 | 6.2266 |
| 49 | 8 | 841 | 1 | 6.5703 |
| 50 | 8 | 885 | 1 | 6.9141 |
| 51 | 8 | 916.5 | 1 | 7.1602 |
| 52 | 8 | 948 | 1 | 7.4063 |

FIG. 11

| MCS Index $I_{MCS}$ | Modulation Order $Q_m$ | Target code Rate R x [1024] | Squeezing factor $\alpha$ | Spectral efficiency |
|---|---|---|---|---|
| 0 | 2 | 120 | 1 | 0.2344 |
| 1 | 2 | 120 | 0.5 | 0.4688 |
| 2 | 2 | 193 | 1 | 0.3770 |
| 3 | 2 | 193 | 0.5 | 0.7540 |
| 4 | 2 | 308 | 1 | 0.6016 |
| 5 | 2 | 308 | 0.5 | 1.2032 |
| 6 | 2 | 449 | 1 | 0.8770 |
| 7 | 2 | 449 | 0.5 | 1.7540 |
| 8 | 2 | 602 | 0.75 | 1.5677 |
| 9 | 2 | 602 | 0.5 | 2.3516 |
| 10 | 4 | 378 | 0.75 | 1.9688 |
| 11 | 4 | 490 | 0.75 | 2.5521 |
| 12 | 4 | 553 | 1 | 2.1602 |
| 13 | 4 | 553 | 0.75 | 2.8803 |
| 14 | 6 | 466 | 1 | 2.7305 |
| 15 | 4 | 616 | 0.75 | 3.2084 |
| 16 | 4 | 658 | 0.75 | 3.4271 |
| 17 | 6 | 517 | 1 | 3.0293 |
| 18 | 6 | 567 | 0.9 | 3.6914 |
| 19 | 6 | 666 | 1 | 3.9023 |
| 20 | 6 | 719 | 1 | 4.2129 |
| 21 | 6 | 772 | 1 | 4.5234 |
| 22 | 6 | 772 | 0.9 | 5.0260 |
| 23 | 6 | 822 | 1 | 5.3516 |
| 24 | 6 | 873 | 0.9 | 5.6836 |
| 25 | 8 | 797 | 1 | 6.2266 |
| 26 | 8 | 885 | 1 | 6.9141 |
| 27 | 8 | 948 | 1 | 7.4063 |
| 28 | 2 | | reserved | |
| 29 | 4 | | reserved | |
| 30 | 6 | | reserved | |
| 31 | 8 | | | |

FIG. 12

| MCS Index $I_{MCS}$ | Modulation Order $Q_m$ | Target code Rate R x [1024] | Squeezing factor $\alpha$ | Spectral efficiency |
|---|---|---|---|---|
| 0 | 2 | 120 | 1 | 0.2344 |
| 1 | 2 | 120 | 0.75 | 0.3125 |
| 2 | 2 | 120 | 0.5 | 0.4688 |
| 3 | 2 | 193 | 1 | 0.3770 |
| 4 | 2 | 180 | 0.75 | 0.4687 |
| 5 | 2 | 170 | 0.5 | 0.6640 |
| 6 | 2 | 308 | 1 | 0.6016 |
| 7 | 2 | 290 | 0.75 | 0.7552 |
| 8 | 2 | 270 | 0.5 | 1.0547 |
| 9 | 2 | 449 | 1 | 0.8770 |
| 10 | 2 | 410 | 0.75 | 1.0677 |
| 11 | 2 | 390 | 0.5 | 1.5234 |
| 12 | 2 | 602 | 1 | 1.1758 |
| 13 | 2 | 550 | 0.75 | 1.4323 |
| 14 | 2 | 500 | 0.5 | 1.9531 |
| 15 | 4 | 378 | 1 | 1.4766 |
| 16 | 4 | 350 | 0.75 | 1.8229 |
| 17 | 4 | 434 | 1 | 1.6953 |
| 18 | 4 | 410 | 0.75 | 2.1354 |
| 19 | 4 | 490 | 1 | 1.9141 |
| 20 | 4 | 450 | 0.75 | 2.3437 |
| 21 | 4 | 553 | 1 | 2.1602 |
| 22 | 4 | 510 | 0.75 | 2.6562 |
| 23 | 4 | 616 | 1 | 2.4063 |
| 24 | 4 | 580 | 0.75 | 3.0208 |
| 25 | 4 | 658 | 1 | 2.5703 |
| 26 | 4 | 610 | 0.75 | 3.1771 |
| 27 | 6 | 466 | 1 | 2.7305 |
| 28 | 6 | 466 | 0.9 | 3.0339 |
| 29 | 6 | 517 | 1 | 3.0293 |
| 30 | 6 | 517 | 0.9 | 3.3659 |
| 31 | 6 | 567 | 1 | 3.3223 |
| 32 | 6 | 567 | 0.9 | 3.6914 |
| 33 | 6 | 616 | 1 | 3.6094 |
| 34 | 6 | 616 | 0.9 | 4.0104 |
| 35 | 6 | 666 | 1 | 3.9023 |
| 36 | 6 | 666 | 0.9 | 4.3359 |
| 37 | 6 | 719 | 1 | 4.2129 |
| 38 | 6 | 719 | 0.9 | 4.6810 |
| 39 | 6 | 772 | 1 | 4.5234 |
| 40 | 6 | 772 | 0.9 | 5.0260 |
| 41 | 6 | 822 | 1 | 4.8164 |
| 42 | 6 | 822 | 0.9 | 5.3516 |
| 43 | 6 | 873 | 1 | 5.1152 |
| 44 | 6 | 873 | 0.9 | 5.6836 |
| 45 | 8 | 682.5 | 1 | 5.3320 |
| 46 | 8 | 711 | 1 | 5.5547 |
| 47 | 8 | 754 | 1 | 5.8906 |
| 48 | 8 | 797 | 1 | 6.2266 |
| 49 | 8 | 841 | 1 | 6.5703 |
| 50 | 8 | 885 | 1 | 6.9141 |
| 51 | 8 | 916.5 | 1 | 7.1602 |
| 52 | 8 | 948 | 1 | 7.4063 |

FIG. 13

| MCS Index $I_{MCS}$ | Modulation Order $Q_m$ | Target code Rate R x [1024] | Squeezing factor $\alpha$ | Spectral efficiency |
|---|---|---|---|---|
| 0 | 2 | 120 | 1 | 0.2344 |
| 1 | 2 | 120 | 0.5 | 0.4688 |
| 2 | 2 | 193 | 1 | 0.3770 |
| 3 | 2 | 170 | 0.5 | 0.6640 |
| 4 | 2 | 308 | 1 | 0.6016 |
| 5 | 2 | 270 | 0.5 | 1.0547 |
| 6 | 2 | 449 | 1 | 0.8770 |
| 7 | 2 | 390 | 0.5 | 1.5234 |
| 8 | 2 | 550 | 0.75 | 1.4323 |
| 9 | 2 | 500 | 0.5 | 1.9531 |
| 10 | 4 | 350 | 0.75 | 1.8229 |
| 11 | 4 | 450 | 0.75 | 2.3437 |
| 12 | 4 | 553 | 1 | 2.1602 |
| 13 | 4 | 510 | 0.75 | 2.6562 |
| 14 | 6 | 466 | 1 | 2.7305 |
| 15 | 4 | 580 | 0.75 | 3.0208 |
| 16 | 4 | 610 | 0.75 | 3.1771 |
| 17 | 6 | 517 | 1 | 3.0293 |
| 18 | 6 | 567 | 1 | 3.6914 |
| 19 | 6 | 666 | 0.9 | 3.9023 |
| 20 | 6 | 719 | 1 | 4.2129 |
| 21 | 6 | 772 | 1 | 4.5234 |
| 22 | 6 | 772 | 1 | 5.0260 |
| 23 | 6 | 822 | 0.9 | 5.3516 |
| 24 | 6 | 873 | 0.9 | 5.6836 |
| 25 | 8 | 797 | 0.9 | 6.2266 |
| 26 | 8 | 885 | 1 | 6.9141 |
| 27 | 8 | 948 | 1 | 7.4063 |
| 28 | 2 | | reserved | |
| 29 | 4 | | reserved | |
| 30 | 6 | | reserved | |
| 31 | 8 | | | |

FIG. 14

Example: New Table for squeezing factor for
MCS table without high order modulations

| SqueezingFactor field | Squeezing factor $\alpha$ |
|---|---|
| 00 | 0.9 |
| 01 | 0.75 |
| 10 | 0.5 |
| 11 | 0.25 |

FIG. 15

Example: New Table for squeezing factor
for MCS table with high order modulations

| SqueezingFactor field | Squeezing factor $\alpha$ |
|---|---|
| 0 | 0.9 |
| 1 | 0.75 |

FIG. 16

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 2 | reserved | |
| 21 | 4 | reserved | |
| 22 | 6 | reserved | |

FIG. 17

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 2 | reserved | |
| 23 | 4 | reserved | |
| 24 | 6 | reserved | |
| 25 | 8 | reserved | |

FIG. 18

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 360 | 0.7031 |
| 4 | 2 | 449 | 0.8770 |
| 5 | 2 | 525 | 1.0254 |
| 6 | 2 | 602 | 1.1758 |
| 7 | 4 | 204 | 0.7969 |
| 8 | 4 | 330 | 1.2890 |
| 9 | 4 | 378 | 1.4766 |
| 10 | 4 | 434 | 1.6953 |
| 11 | 4 | 490 | 1.9141 |
| 12 | 4 | 553 | 2.1602 |
| 13 | 4 | 616 | 2.4063 |
| 14 | 4 | 658 | 2.5703 |
| 15 | 6 | 265 | 1.5527 |
| 16 | 6 | 390 | 2.2852 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 25 | 6 | 772 | 4.5234 |
| 26 | 8 | 682.5 | 5.3320 |
| 27 | 8 | 754 | 5.8906 |
| 28 | 2 | reserved | |
| 29 | 4 | reserved | |
| 30 | 6 | reserved | |
| 31 | 8 | reserved | |

TERMINAL

TECHNICAL FIELD

The present invention relates to a terminal that performs radio communication and particularly, relates to a terminal that supports Faster-Than-Nyquist (FTN) transmission.

BACKGROUND ART

The 3rd Generation Partnership Project (3GPP) specifies Long Term Evolution (LTE), and with the aim of further speeding, specifies LTE-Advanced (hereinbelow, the LTE includes the LTE-Advanced). In the 3GPP, specifications for 5th generation mobile communication system (5G, also called as New Radio (NR) or Next Generation (NG)) are also being considered.

In the 3GPP Release 15 (NR) specification, the size (TBS) of the transport block is determined by a modulation order, a target code rate, Modulation and Coding Scheme (MCS), and the like. Specifically, the terminal (User Equipment, UE) and the radio base station (gNB) can flexibly determine the MCS based on the MCS index and the MCS index table corresponding to the MCS index (Non-Patent Document 1). Thereby, adaptive modulation/channel coding (AMC: Adaptive Modulation Coding) according to the communication quality can be realized.

The current NR specifications are based on Nyquist rate and do not support Faster-Than-Nyquist (FTN) transmission. FTN can improve frequency utilization efficiency compared to the Nyquist transmission by multiplexing symbols at a higher rate than the Nyquist rate (Non-Patent Document 2).

The FTN allows inter-symbol interference (ISI) and inter-subcarrier interference (Inter-subCarrier Interference) and improves the frequency utilization efficiency by multiplexing symbols at a high density.

PRIOR ART DOCUMENT

Non-Patent Document

Non-Patent Document 1: 3GPP TS 38.214 V15.6.0, 3rd Generation Partnership Project; Technical Specification Group Radio Access Network; NR; Physical layer procedures for data (Release 15), 3GPP, June 2019

Non-Patent Document 2: H. Lin, N. Lahbabi, P. Siohan and X. Jiang, "An efficient FTN implementation of the OFDM/OQAM system", 2015 IEEE International Conference on Communications (ICC), London, 2015, pp. 4787-4792

SUMMARY OF THE INVENTION

It is considered that a higher throughput or a lower bit error rate (BER) can be realized by combining the FTN and the flexible MCS as described above.

The present invention has been made in view of the above discussion. One object of the present invention is to provide a terminal that can achieve improvement in the throughput and lowering of the bit error rate (BER) at a high level while applying the Faster-Than-Nyquist (FTN).

According to one aspect of the present disclosure a terminal (UE 200) includes a control unit that determines a target code rate by using a reference code rate, which is based on a modulation scheme and a modulation order, and an adjustment coefficient (Squeezing factor) that reduces the reference code rate; and a transmitting and receiving unit (FTN modulation module and FTN demodulation module) that transmits and receives signals encoded based on the target code rate.

According to another aspect of the present disclosure a terminal (UE 200) includes a control unit that increases a frequency utilization efficiency by using an adjustment coefficient (Squeezing factor) while maintaining a reference code rate based on a modulation scheme and a modulation order; and a transmitting and receiving unit (FTN modulation module and FTN demodulation module) that transmits and receives signals with the increased utilization efficiency.

BRIEF DESCRIPTION OF DRAWINGS

FIG. 5 is a diagram illustrating a configuration example of a new MCS index table in which a squeezing factor is added.

FIG. 6 is a diagram showing a configuration example (large size) of MCS index table based on Option 1-1 (existing MCS index table base).

FIG. 7 is a diagram showing a configuration example (same size) of the MCS index table based on Option 1-1 (existing MCS index table base).

FIG. 8 is a diagram showing a configuration example (large size) of MCS index table based on Option 1-2 (existing MCS index table base).

FIG. 9 is a diagram showing a configuration example (same size) of the MCS index table based on Option 1-2 (existing MCS index table base).

FIG. 10 is a diagram showing a configuration example (large size) of MCS index table based on Option 2-1 (existing MCS index table base).

FIG. 11 is a diagram showing a configuration example (same size) of the MCS index table based on Option 2-1 (existing MCS index table base).

FIG. 12 is a diagram showing a configuration example (large size) of MCS index table based on Option 2-2 (existing MCS index table base).

FIG. 13 is a diagram showing a configuration example (same size) of the MCS index table based on Option 2-2 (existing MCS index table base).

FIG. 14 is a diagram showing a configuration example (part 1) of a new table for a squeezing factor.

FIG. 15 is a diagram showing a configuration example (part 2) of the new table for the squeezing factor.

FIG. 16 is a diagram showing a configuration example of the MCS index table based on Option 2-1 (new table base for the squeezing factor).

FIG. 17 is a diagram showing a configuration example of the MCS index table based on Option 2-2 (new table base for squeezing factor).

FIG. 18 is a diagram showing a configuration example of MCS index table based on Option 2-3 (new table base for squeezing factor).

MODES FOR CARRYING OUT THE INVENTION

Figure 1:
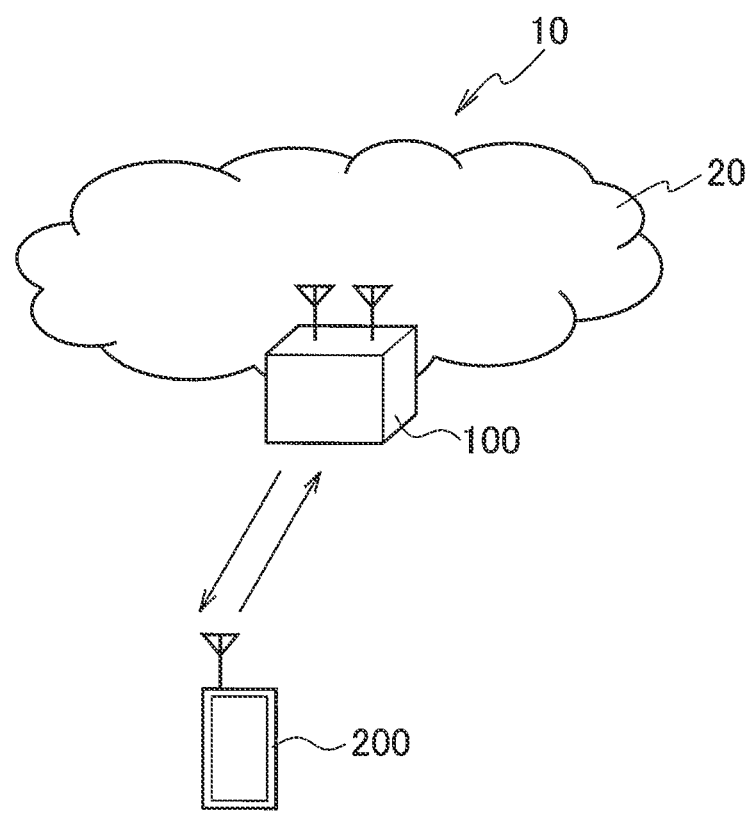
FIG. 1 is an overall schematic configuration diagram of a radio communication system 10.

Exemplary embodiments of the present invention are explained below with reference to the accompanying drawings. Note that, the same or similar reference numerals have been attached to the same functions and configurations, and the description thereof is appropriately omitted.

(1) Overall Schematic Configuration of Radio Communication System

FIG. 1 is an overall schematic configuration diagram of a radio communication system 10 according to the present embodiment. The radio communication system 10 is a radio communication system according to 5G New Radio (NR). The radio communication system 10 includes Next Generation-Radio Access Network 20 (hereinafter, "NG-RAN 20") and a terminal 200 (hereinafter, "UE 200", "User Equipment").

The NG-RAN 20 includes a radio base station 100 (hereinafter, "gNB 100"). A concrete configuration of the radio communication system 10, including the number of the gNBs and the UEs, is not limited to the example shown in FIG. 1.

The NG-RAN 20 actually includes a plurality of NG-RAN Nodes, in particular, the gNBs (or ng-eNB). Also, the NG-RAN 20 is connected to a core network (5GC, not shown) according to the 5G. The NG-RAN 20 and the 5GC may be simply expressed as "network".

The gNB 100 is a radio base station according to the 5G. The gNB 100 performs a radio communication with the UE 200 according to the 5G. The gNB 100 and the UE 200 can handle, by controlling a radio signal transmitted from a plurality of antenna elements, Massive MIMO (Multiple-Input Multiple-Output) that generates a beam with a higher directivity, carrier aggregation (CA) that bundles a plurality of component carriers (CC) to use, dual connectivity (DC) in which communication is performed simultaneously between two NG-RAN Nodes and the UE, and the like. The radio communication system 10 corresponds to FR1 and FR2. The frequency band of each FR is as below.

FR1: 410 MHz to 7.125 GHz
FR2: 24.25 GHz to 52.6 GHz

In FR1, 15 kHz, 30 kHz, or 60 kHz Sub-Carrier Spacing (SCS) is used, and a bandwidth (BW) of 5 MHz to 100 MHz is used. FR2 has a higher frequency than FR1. Moreover, FR2 uses SCS of 60 kHz or 120 kHz (240 kHz may be included), and uses a bandwidth (BW) of 50 MHz to 400 MHz.

Note that SCS may be interpreted as numerology. The numerology is defined in 3GPP T538.300 and corresponds to one subcarrier spacing in the frequency domain.

Furthermore, the radio communication system 10 can handle to a frequency band that is higher than the frequency band of FR2. Specifically, the radio communication system 10 can handle a frequency band exceeding 52.6 GHz and up to 114.25 GHz. Here, such a high frequency band is referred to as "FR4" for convenience. FR4 belongs to so-called EHF (extremely high frequency, also called millimeter wave). FR4 is a temporary name and may be called by another name.

FR4 may be further classified. For example, FR4 may be divided into a frequency range of 70 GHz or less and a frequency range of 70 GHz or more. Alternatively, FR4 may be divided into more frequency ranges, and may be divided in frequencies other than 70 GHz.

Here, the frequency band between FR2 and FR1 is referred to as "FR3" for convenience. FR3 is a frequency band above 7.125 GHz and below 24.25 GHz.

In the present embodiment, FR3 and FR4 are different from the frequency band including FR1 and FR2, and may be called different frequency bands.

Particularly, as described above, in a high frequency band such as FR4, an increase in phase noise between carriers becomes a problem. This may require application of a larger (wider) SCS or a single carrier waveform.

Also, a narrower beam (i.e., a larger number of beams) may be required due to increased propagation loss. In addition, since it is more sensitive to peak-to-average power ratio (PAPR) and power amplifier nonlinearity, a greater (wider) SCS (and/or fewer FFT points), a PAPR reduction mechanism, or a single carrier waveform may be required.

In order to address these issues, in this embodiment, when using a band exceeding 52.6 GHz, Cyclic Prefix-Orthogonal Frequency Division Multiplexing (CP-OFDM) or Discrete Fourier Transform having a larger Sub-Carrier Spacing (SCS)—Spread (DFT-S-OFDM) can be applied.

The radio communication system 10 can support Faster-Than-Nyquist (FTN) transmission. FTN can improve frequency utilization efficiency compared to Nyquist rate transmission by multiplexing symbols (specifically, OFDM symbols, where appropriate abbreviated as symbol) at a higher rate than Nyquist rate.

The FTN allows inter-symbol interference (ISI: Inter-Symbol Interference) and inter-subcarrier interference (Inter-subCarrier Interference), and can improve frequency utilization efficiency by multiplexing OFDM symbols at a high density. The frequency utilization efficiency may be simply referred to as utilization efficiency, or may be referred to as spectral efficiency (SE).

Figure 2:
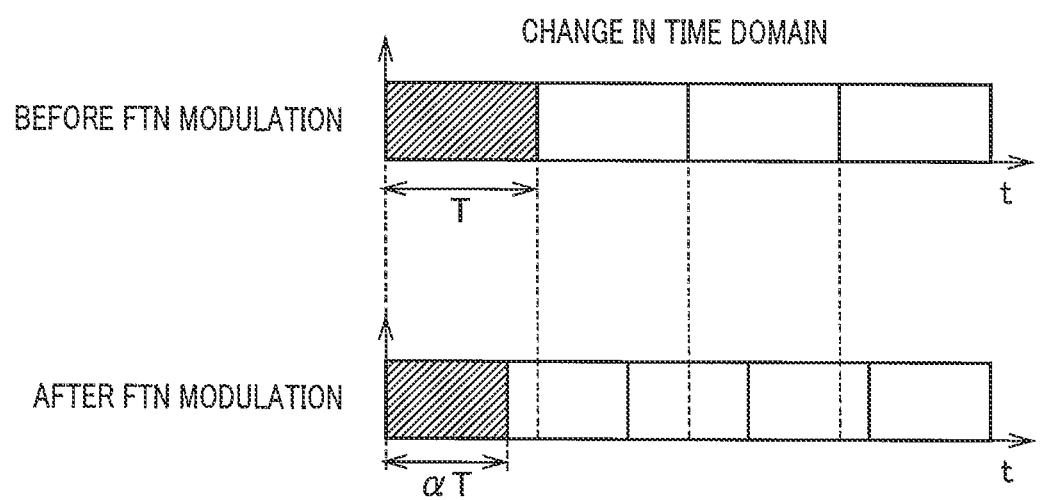
FIG. 2 is a diagram showing changes in a time domain when FTN and DFT-S-OFDM are combined.
Figure 3:
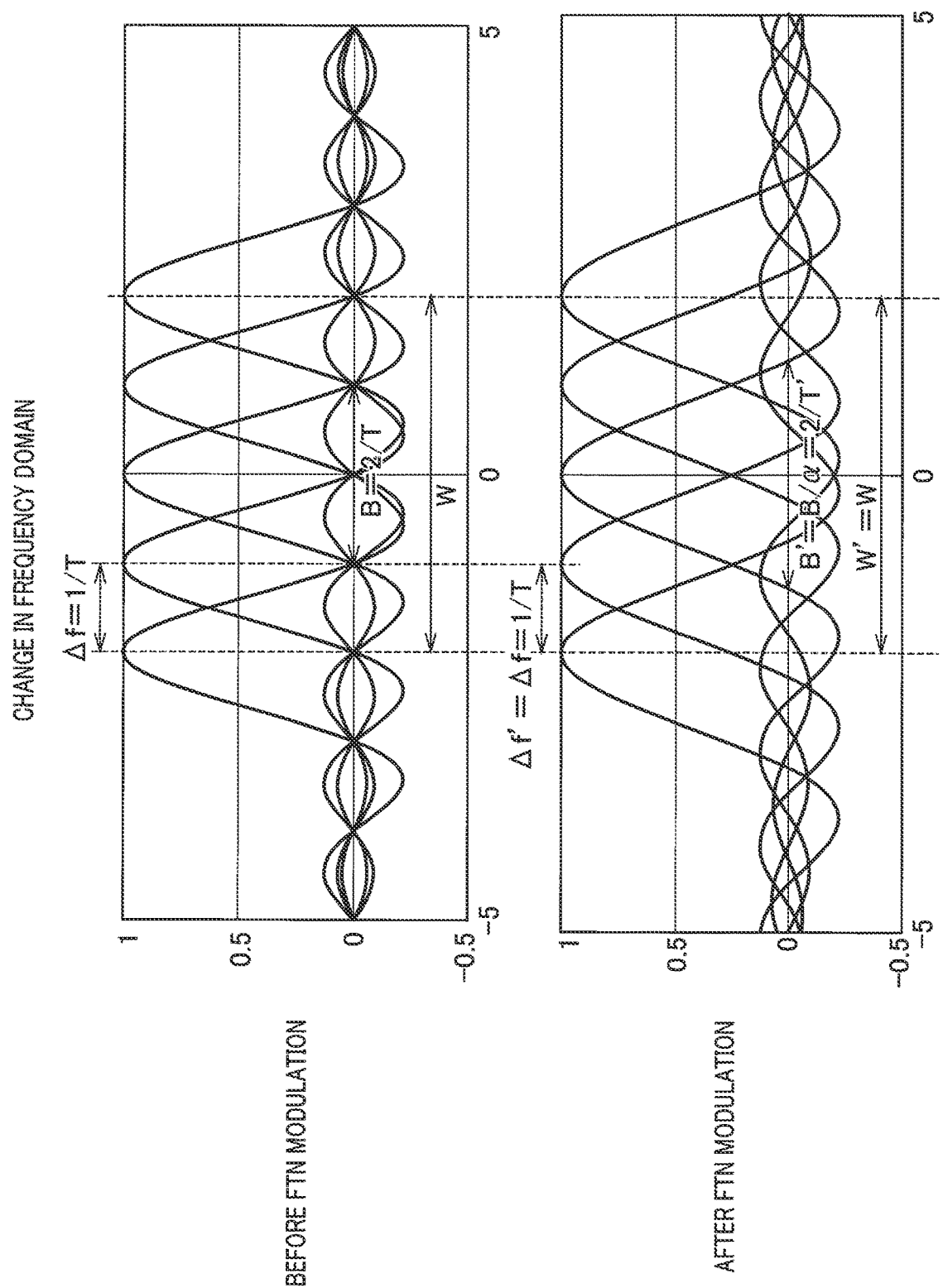
FIG. 3 is a diagram showing changes in a frequency domain when FTN and DFT-S-OFDM are combined.

FIG. 2 shows changes in a time domain when FTN and DFT-S-OFDM are combined. FIG. 3 shows changes in a frequency domain when FTN and DFT-S-OFDM are combined.

Non-orthogonal subcarriers can be expressed as below:

$$\text{Subcarrier spacing}(\Delta f) \times \text{OFDM symbol}(T) = \alpha < 1 \ s$$

Here, $\alpha$ is called an FTN modulation coefficient. As shown in FIG. 2, when comparing before FTN modulation and after FTN modulation, after FTN modulation, the symbol length of the OFDM symbol is scaled by FTN modulation coefficient $\alpha$. Incidentally, $\alpha$ may be referred to as Squeezing factor (squeezing factor).

Specifically, the symbol length becomes shorter than that before the FTN modulation. That is, when compared with before the FTN modulation, the OFDM symbol is compressed in the time direction. The degree of compression can be controlled by $\alpha$.

The symbol length may be referred to as a symbol time length, a symbol length, a symbol period, a symbol time, or the like.

Also, as shown in FIG. 3, a subcarrier bandwidth (B') after the FTN modulation is substantially expanded by $\alpha$, that is, the OFDM symbol compressed in the time direction, making it possible to perform the transmission at a higher rate.

Thus, when FTN that performs time domain compression is applied to OFDM, the OFDM symbol of each subcarrier is multiplexed at a rate faster than the Nyquist rate. Thereby, the throughput (communication capacity) can be improved. Table 1 shows an example of FTN limit value and a rate growth rate according to a modulation order (Source: Non-Patent Document 2).

TABLE 1

|  | FTN limit | Rate growth |
|---|---|---|
| QPSK | 0.5 | 2 |
| 16QAM | 0.7 | 1.43 |
| 64QAM | 0.9 | 1.11 |

As shown in Table 1, the throughput can be improved by FTN regardless of the modulation order. The FTN limit value (FTN limit) is the FTN modulation coefficient (α) that does not cause a decrease in the bit error rate (BER), and the higher the modulation order, the lower the efficiency. In other words, the maximum gain (rate growth rate) of FTN that does not cause a decrease in BER decreases as the modulation order increases.

For example, in Quadrature Phase Shift Keying (QPSK), the FTN limit is 0.5, and the OFDM symbol is compressed to half the length of time before the FTN modulation. This increases the rate by a factor of two.

Considering such FTN characteristics, for example, when the frequency utilization efficiency (SE) and the modulation order are the same, it can be said that the FTN transmission at a low code rate exhibits better BER characteristics than Nyquist transmission at a high code rate.

Also, if the modulation order and the code rate are fixed, it can be said that the FTN transmission can achieve higher SE while allowing a certain degree of BER increase.

Further, when the modulation order is fixed and the code rates are different, it can be said that FTN transmission can achieve both high SE and low BER by adjusting the FTN modulation coefficient (a) and the code rate.

(2) Functional Block Configuration of Radio Communication System

Next, the functional block configuration of radio communication system 10 will be described. Specifically, the functional block configuration of the gNB 100 and the UE 200 will be described.

Figure 4:
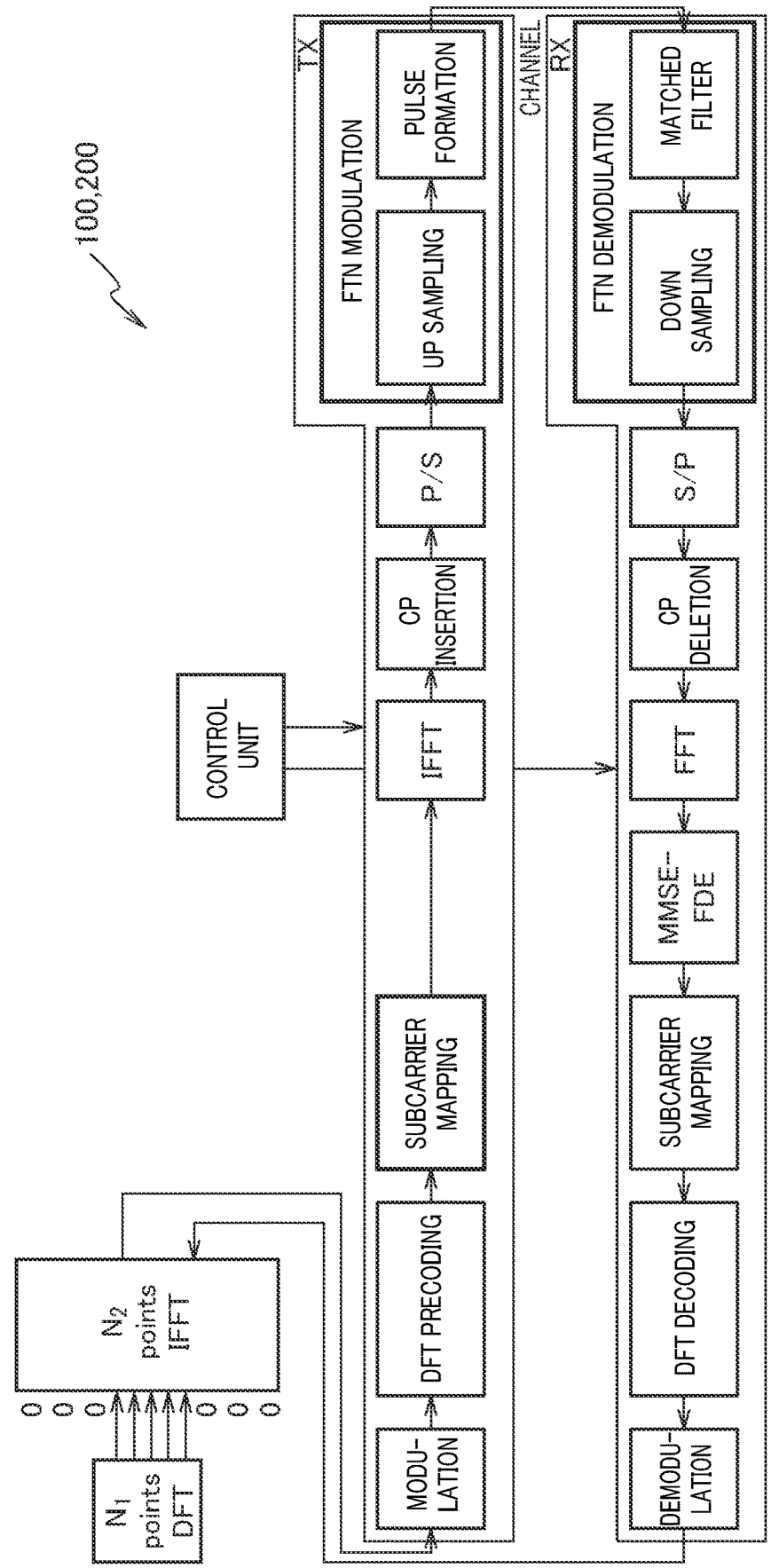
FIG. 4 is a schematic functional block diagram of a gNB 100 and UE 200.

FIG. 4 is a schematic functional block diagram of the gNB 100 and the UE 200. Since the gNB 100 and the UE 200 have the same general functional block configuration, the functional block of the UE 200 will be described below as an example.

As explained above, in the radio communication system 10, DFT-S-OFDM (applicable to both downlink (DL) and uplink (UL)) and FTN are applicable. Further, DFT-S-OFDM is preferable from the viewpoint of securing low PAPR.

A limited number of RF chains can reduce SE, but FTN can improve SE by using a waveform that is compressed (squeezed) in the time direction.

It should be noted that the schematic functional block diagram shown in FIG. 4 mainly shows the parts related to FTN and DFT-S-OFDM. FIG. 4 shows the related functional blocks by dividing them into the transmitting side and the receiving side.

Since DFT-S-OFDM is used on the transmission side, DFT precoding is performed after modulation based on the selected modulation scheme, and subcarrier mapping is performed on the symbols. A subcarrier is a sine wave having a different carrier frequency, and the phase and amplitude of each subcarrier are set according to the type of symbol to be transmitted. Here, application of FTN is considered, and intensive mapping to low frequency subcarriers is performed.

Thereafter, inverse fast Fourier transform (IFFT) is performed on a plurality of symbols, and a time signal sequence is output. The input symbols are transmitted in parallel by individual subcarriers. A cyclic prefix (CP) is added to the OFDM signal after IFFT.

On the transmission side, FTN modulation module is provided after CP addition, that is, after DFT-S-OFDM.

Following the FTN, the FTN modulation module multiplexes OFDM symbols at a rate faster than Nyquist rate. Specifically, the FTN modulation module has an upsampling function and a waveform shaping function after the sampling.

The reception side performs the reverse process of the process performed on the transmission side described above. On the receiving side, a frequency domain equalization (FDE) function based on a minimum mean square error (MMSE) standard is implemented. As a result, frequency domain equalization based on the MMSE standard is performed, and the BER characteristics can be improved.

Specifically, the combination of DFT-S-OFDM and FTN using FDE can improve SE over DFT-S-OFDM alone, at the expense of a moderate increase in signal-to-noise ratio (SNR). Further, the combination of DFT-S-OFDM and FTN using FDE can achieve the same BER and SE performance as in the case of using CP-OFDM.

On the receiving side, the FTN demodulation module is provided before CP removal. The FTN demodulation module has a matched filter and a downsampling function.

The FTN modulation module and the FTN demodulation module transmit and receive signals constituted by a plurality of symbols (specifically, OFDM symbols or may be called FTN symbols because they are after FTN) and subcarriers.

In the present embodiment, the FTN modulation module and the FTN demodulation module constitute a transmitting and receiving unit that transmits and receives a signal encoded based on a target code rate (Target code Rate). Specifically, the Target code Rate (R) is specified in Chapter 5 (downlink (DL)) and Chapter 6 (uplink (UL)) of 3GPP TS38.214, and is determined along with the modulation order (Modulation Order ($Q_m$)) and the like.

More specifically, the UE 200 reads a 5-bit Modulation and Coding Scheme (MCS) field ($I_{MCS}$) of downlink control information (DCI), and determines the modulation order ($Q_m$) and the Target code Rate (R). Further, the UE 200 determines the size (TBS) of the transport block by using the total number ($n_{PRB}$) of Physical Resource Blocks (PRB) allocated before the rate matching.

That is, the UE 200 determines the Target code Rate (R) based on $I_{MCS}$ and $Q_m$. $I_{MCS}$ is an index of modulation and coding scheme, and is used to determine the modulation scheme to be applied (for example, Quadrature Phase Shift Keying (QPSK), 16 QAM (Quadrature Amplitude Modulation), and the like).

As explained above, the radio communication system 10 supports FTN, and the control unit adjusts the Target code Rate by using the FTN modulation coefficient α. Specifically, the control unit lowers the Target code Rate (here, referred to as a reference code rate) determined according to the conventional NR specification (3GPP TS38.214) to which, as explained above, FTN is not applied.

That is, the control unit determines the new target code rate by using the reference code rate and the FTN modulation coefficient α that lowers the reference code rate. The FTN modulation coefficient α adjusts the reference code rate and may be called an adjustment coefficient. The reference code rate may be interpreted as a target code rate before FTN is applied, that is, before FTN modulation coefficient α is applied.

Alternatively, the control unit may use the FTN modulation coefficient α to increase the frequency utilization efficiency, specifically, spectral efficiency (Spectral Efficiency (SE)). The control unit increases the SE by using the FTN modulation coefficient α while maintaining the target code rate (reference code rate) based on $I_{MCS}$ (modulation scheme) and $Q_m$ (modulation order).

The FTN modulation module and the FTN demodulation module transmit and receive signals in which SE is increased in this way.

The control unit may determine the size (TBS) of the transport block by using the FTN modulation coefficient α. Specifically, the control unit changes Equation used for the TBS calculation defined in the conventional NR specification (3GPP TS38.214) to which FTN is not applied in the manner shown below:

$$N_{info} = \frac{1}{\alpha} \cdot N_{RE} \cdot R \cdot Q_m \cdot \upsilon$$

The calculation of TBS by using this equation will be described later.

In addition, the FTN modulation module can transmit, to the network, based on control from the control unit, capability information (UE capability) indicating whether the UE 200 supports processing using the FTN modulation coefficient α. The capability information may typically be transmitted by upper layer signaling such as a medium access control layer (RRC), but may be transmitted by lower layer signaling.

Note that, the UE 200 supports processing related to a defined reference signal, a control signal, a control channel, and a data channel in order to execute the radio communication according to NR.

For example, the UE 200 executes processing by using reference signals (RS) such as Demodulation reference signal (DMRS) and Phase Tracking Reference Signal (PTRS).

DMRS is a known reference signal (pilot signal) for estimating a fading channel used for data demodulation between a base station specific for a terminal and the terminal. PTRS is a terminal-specific reference signal for the purpose of estimating phase noise which is an issue in the high frequency band.

The reference signal includes, apart from DMRS and PTRS, Channel State Information-Reference Signal (CSI-RS) and Sounding Reference Signal (SRS).

Further, the UE 200 transmits and receives a radio resource control layer (RRC) control signal via the control channel.

A channel includes a control channel and a data channel. A control channel includes PDCCH (Physical Downlink Control Channel), PUCCH (Physical Uplink Control Channel), RACH (Random Access Channel), Downlink Control Information (DCI) including Random Access Radio Network Temporary Identifier (RA-RNTI), and Physical Broadcast Channel (PBCH).

A data channel includes PDSCH (Physical Downlink Shared Channel), PUSCH (Physical Downlink Shared Channel), and the like. Data means data transmitted via a data channel.

The UE 200 transmits and receives Protocol Data Unit (PDU) and Service Data Unit (SDU). Specifically, the UE 200 executes PDU/SDU assembly/disassembly and the like in multiple layers (such as medium access control layer (MAC), radio link control layer (RLC), and packet data convergence protocol layer (PDCP)).

(3) Operation of Radio Communication System

Next, an operation of the radio communication system 10 will be described. Specifically, the adaptive modulation/channel coding (AMC) operation performed by the UE 200 after considering FTN will be described.

Specifically, the FTN modulation coefficient (Squeezing factor) α is set to 0<α≤1, and by adjusting of the target code rate or the spectral efficiency (SE) can realize more flexible and appropriate link adaptation according to use cases (for example, Broadband (eMBB), Ultra-Reliable and Low Latency Communications (URLLC)).

In the present embodiment, by combining FTN and flexible MCS, a larger capacity than Nyquist transmission (which may be called Nyquist signaling), that is, a high throughput or a reduction in the bit error rate (BER), is realized.

Regarding the increase in the communication capacity and the decrease in the BER due to FTN, the following can be considered.

Increase in Communication Capacity
(i) Even with a high-order modulation with a high modulation order, FTN can achieve a higher SE than that of the Nyquist transmission.
(ii) The maximum capacity gain at which the BER does not decrease decreases as the modulation order increases.
(iii) The supportable squeezing factor (i.e., FTN limit) increases as the modulation order increases.
(iv) If a moderate BER deterioration can be tolerated, the communication capacity can be expected to increase even with the higher-order modulation.

Decrease in BER
(i) If the target SE is fixed, a low modulation order and/or a low code rate can achieve a lower BER than that in the Nyquist transmission with a high modulation order and/or a high code rate.

In the following, a modification example of the MCS index table defined in the conventional NR specification (3GPP TS38.214), a new TBS calculation method, a new table for the Squeezing factor, and signaling of the capability information (UE capability) of the UE 200 related to the FTN when the Squeezing factor α is applied will be described.

(3.1) Configuration Example of MCS Index Table

FIG. 5 shows a configuration example of a new MCS index table in which the Squeezing factor has been added. FIG. 5 shows a case in which the MCS index table described in 5.1.3 of 3GPP TS38.214 is changed.

As shown in FIG. 5, the Squeezing factor α is added. As explained above, α may be equivalent to the FTN limit value (FTN limit), and may be referred to as the FTN modulation coefficient, the adjustment coefficient, squeezing factor, or compression factor.

No change other than the Squeezing factor is made, therefore, it is possible to use existing procedures and signaling on MCS of NR.

When using such a MCS index table, the following options can be considered:

(Option 1): Using the same SE value as in the existing MCS index table
  (Option 1-1): Adding a new combination of the Squeezing factor and the Target code Rate (R) for each modulation order.
  (Option 1-2): For each of the existing Target code Rate, adding a new combination of the Squeezing factor and the modulation order ($Q_m$).
(Option 2): Adding a new SE value to the MCS index table
  (Option 2-1): Using the identical Modulation order and Target code Rate combinations as in the existing MCS index table, and adding the MCS index having the new SE values by the Squeezing factor.
  (Option 2-2): Using a different Modulation order and Target code Rate combinations as in the existing MCS index table, and adding a MCS index having a new SE values by different combinations of the Squeezing factor, the Modulation order, and the Target code Rate.

As for all of the options, the size of the MCS index table may be larger than the existing MCS index table, or the size may be the same. It should be noted that, when the size is the same, some of the existing MCS index are deleted.

Further, MCS index table is used in UL and DL, the application of the new MCS index table may be only in one direction, or in both directions.

Example of each options are described below:

(3.1.1) Option 1-1

FIG. 6 shows a configuration example (large size) of MCS index table based on Option 1-1. As shown in FIG. 6, the minimum value of a increases as the modulation order increases. In this configuration example, the MCS index is increased and the table size is larger than the existing MCS index table.

In this configuration example, the minimum values of α for QPSK and 64 QAM are 0.5 and 0.9, respectively. This takes into account the limit value (FTN limit) (see Table 1).

Also, number of a increases with the target code rate. In this configuration example, different values of α are added to Target code Rate=308 [1024] and 449 [1024]. This is because the coding gain after the FTN modulation is limited when the code rate is low. Therefore, in order to suppress the increase in the table size and the overhead, it is preferable to set a plurality of as for a low code rate.

FIG. 7 shows a configuration example (same size) of the MCS index table based on Option 1-1. In this configuration example relates to a case in which the size is the same size as the existing MCS index table.

In this configuration example, some of the conventional high code rate MCS indexes are replaced by low code rate MCS indexes with α<1. For example, to achieve the same SE: 0.6016, $I_{MCS}$=2 Target code Rate: 308 [1024] is replaced by Target code Rate: 154 [1024], α=0.5.

(3.1.1) Option 1-2

FIG. 8 shows a configuration example (large size) of MCS index table based on Option 1-2. In the following, points that are different from Option 1-1 will be mainly described.

In this configuration example, QPSK has the lowest modulation order ($Q_m$=2). Therefore, a squeezing factor that satisfies α<1 is not set in the QPSK.

Also, in this configuration example, unlike Option 1, the modulation order is not arbitrary and is limited to {2, 4, 6, 8}. Therefore, the value of α is not arbitrary.

FIG. 9 shows a configuration example (same size) of the MCS index table based on Option 1-2.

In this configuration example, some of the conventional high code rate MCS indexes are replaced by low code rate MCS indexes with α<1. For example, in order to achieve the same SE: 1.4766, the $Q_m$ of $I_{MCS}$=5 is replaced from "4" to "2" and is replaced by α=0.5.

(3.1.3) Option 2-1

FIG. 10 shows a configuration example (large size) of MCS index table based on Option 2-1.

As shown in FIG. 10, the minimum value of α increases as the modulation order increases.

FIG. 11 shows a configuration example (same size) of the MCS index table based on Option 2-1.

(3.1.4) Option 2-2

FIG. 12 shows a configuration example (large size) of MCS index table based on Option 2-2.

In Option 2-1, only a squeezing factor was added to each modulation order and Target code Rate to achieve the new SE value; however, in the present configuration example, in order to achieve the new SE value, the squeezing factor is added and the target code rate is changed.

FIG. 13 shows a configuration example (same size) of the MCS index table based on Option 2-2.

Note that both the MCS index table including α and the conventional MCS index table not including a may be defined. In this case, it is preferable that the capability information indicating whether the UE 200 is compatible with the MCS index table including α is signaled to the network. The capability information signaling will be described later.

If the MCS index table including α is set, the table size may increase. Therefore, it is preferable to define the signaling for MCS that defines and sets the MCS bit size of DCI.

(3.2) TBS Calculation Method

For example, (Equation 1) is used in the calculation of TBS defined in the existing NR (T538.214) (in the case of PDSCH).

$$N_{info} = N_{RE} \cdot R \cdot Q_m \cdot \upsilon \qquad \text{Equation 1}$$

$N_{info}$ is the number of intermediate information bits. $N_{RE}$ is the total number of resource elements (RE) allocated to PDSCH, that is, the number of usable resource elements. R is the code rate and $Q_m$ is the modulation order. u is the number of MIMO layers. TBS is selected or calculated based on the obtained $N_{info}$ value.

(Equation 1) incorporates the squeezing factor (α) and is changed to (Equation 2).

$$N_{info} = \frac{1}{\alpha} \cdot N_{RE} \cdot R \cdot Q_m \cdot \upsilon \qquad \text{Equation 2}$$

In the case of (Equation 2), $N_{RE}$ and numerology are independent of α. Instead of calculating TBS that explicitly considers α by using (Equation 2), TBS that implicitly considers α may be calculated.

Specifically, TBS may be calculated by using $N_{RE}$ and/or numerology as a function of a and by using (Equation 1) as it is.

(3.3) Configuration Example of New Table for Squeezing Factor

Instead of changing the contents of the MCS index table as described above, a new table for the squeezing factor may be defined. In this case, new signaling for the squeezing factor is defined and TBS is scaled according to the new signaling.

Specifically, the new table for the squeezing factor related to the MCS index table is defined. Further, RRC, MAC-CE, and/or DCI may be used for signaling for setting both the tables.

For example, a new DCI field (e.g., may be called "SqueezingFactor scaling") can be defined to display the squeezing factor. The default value of the squeezing factor α may be "1".

Also, the number ($N_{RE}$) of resource elements (RE) and the numerology are independent of α, and when PDSCH or PUSCH is the target, TBS is determined by using SqueezingFactor scaling included in DCI while using (Equation 2).

FIGS. 14 and 15 show a configuration example of a new table for the squeezing factor. FIG. 14 is for the MCS index table with a low modulation order and includes α with a low value. On the other hand, FIG. 15 is for the MCS index table with a high modulation order, and only α with a high value is included. The new table may include α=1.

Also, when only one such new table is defined, the UE 200 is not expected to support several Squeezing factors along with some MCS indexes.

For example, MCS index having a high modulation order (e.g., 16 QAM, 64 QAM, 256 QAM) is used with a high value of α (e.g., Squeezing Factor Field=00:α=0.9, Squeezing Factor Field=01:α=0.75 shown in FIG. 14).

When using such a new table, the following options are conceivable:
(Option 1): Reusing existing MCS index table
(Option 2): Updating the existing MCS index table
(Option 2-1): Decreasing the size of the MCS index table and deleting the MCS index of higher-order modulation
(Option 2-2): Reducing the size of the MCS index table and updating the contents
(Option 2-3): Updating the contents while maintaining the size of MCS index table (increasing the MCS index of low code rate and decreasing the MCS index of high-order modulation)

(3.3.1) Option 2-1

FIG. 16 shows a configuration example of the MCS index table based on Option 2-1. In this configuration example, the size of the MCS index table is reduced, and the MCS index for the higher-order modulation is deleted.

That is, the MCS index of the higher-order modulation is replaced with the MCS index that is a combination of the low modulation order and the squeezing factor (FTN modulation coefficient).

(3.3.2) Option 2-2

FIG. 17 shows a configuration example of MCS index table based on Option 2-2. In this configuration example, the size of the MCS index table is reduced and the contents are updated.

The content change is due to the introduction of FTN, and this configuration example is obtained by dividing the MCS index table shown in FIGS. 6 to 9 into a new table for the Squeezing factor shown in FIGS. 14 and 15 and the MCS index table shown in FIGS. 16 to 18.

(3.3.3) Option 2-3

FIG. 18 shows a configuration example of MCS index table based on Option 2-3. In this configuration example, the contents are updated while maintaining the size of the MCS index table.

Specifically, the low code rate MCS index is increased and the high-order modulation MCS index is decreased.

(3.4) Signaling of Capability Information (UE Capability)

The UE 200 (terminal) can notify the network of the capability information (UE capability) for supporting FTN modulation.

The definition of capability information indicating support for the FTN modulation includes the following two:
Capability information for transmission processing in UL
Capability information for reception processing in DL
The following options are also possible:
(Option 1): Transmission processing in UL/reception processing in DL with applied with the FTN modulation is an indispensable capability regardless of the presence/absence of terminal capability information signaling at least under specific conditions (for example, within a specific frequency range).
(Option 2): Transmission processing in UL/reception processing in DL applied with the FTN modulation becomes an indispensable capability by signaling terminal capability information at least under specific conditions
(Option 3): Transmission processing in UL/reception processing in DL applied with the FTN modulation is an option based on terminal capability information signaling In the case of Options 2 and 3, the terminal notifies (signals) the capability information of the terminal to the network.

In addition, in order to set which of the above-described MCS index tables is applied to the terminal from the network, signaling for setting a specific MCS index table may be defined. RRC, MAC-CE, and/or DCI may be used for the signaling.

(4) Advantageous Effects

According to the embodiment described above, the following advantageous effects can be obtained. Specifically, according to the UE 200 (and the gNB 100), a new target can be determined by using the conventional code rate (reference code rate) to which the FTN modulation is not applied and the squeezing factor (α) that lowers the code rate.

Further, according to the UE 200 (and the gNB 100), it is possible to increase the frequency utilization efficiency, specifically, the spectral efficiency (Spectral Efficiency (SE)), by using the FTN modulation coefficient α.

Therefore, even when Faster-Than-Nyquist (FTN) is applied, higher throughput or lower bit error rate (BER) can be realized by combining with the MCS that is flexible. That is, according to the UE 200 (and the gNB 100), it is possible to achieve both higher throughput and lower bit error rate (BER) at a higher level while applying FTN.

In the present embodiment, the UE 200 (and the gNB 100) can determine the size (TBS) of the transport block by using the FTN modulation coefficient α. For this reason, even when the FTN is applied, an appropriate TBS can be set.

In the present embodiment, the UE 200 can transmit capability information (UE capability) indicating whether it supports processing using the FTN modulation coefficient α, that is, whether it can support FTN modulation, to the network. For this reason, the appropriate link adaptation according to the capability regarding FTN of the UE 200 can be realized.

(5) Other Embodiments

Although the contents of the present invention have been described by way of the embodiments, it is obvious to those skilled in the art that the present invention is not limited to what is written here and that various modifications and improvements thereof are possible.

For example, in the above-described embodiment, it has been described that it can be applied to a high frequency band such as FR4, that is, a frequency band exceeding 52.6 GHz; however, the above-described operation related to the FTN modulation may be applied to other frequency ranges such as FR3.

Furthermore, as explained above, FR4 may be divided into a frequency range of 70 GHz or less and a frequency range of 70 GHz or more. For example, the application of the FTN modulation to the frequency range may be changed as appropriate. For example, the FTN modulation may be applied only to the frequency range of 70 GHz or higher.

Moreover, the block diagram used for explaining the embodiments (FIG. 4) shows blocks of functional unit. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that causes transmitting may be called a transmitting unit or a transmitter. For any of the above, as explained above, the realization method is not particularly limited to any one method.

Figure 19:
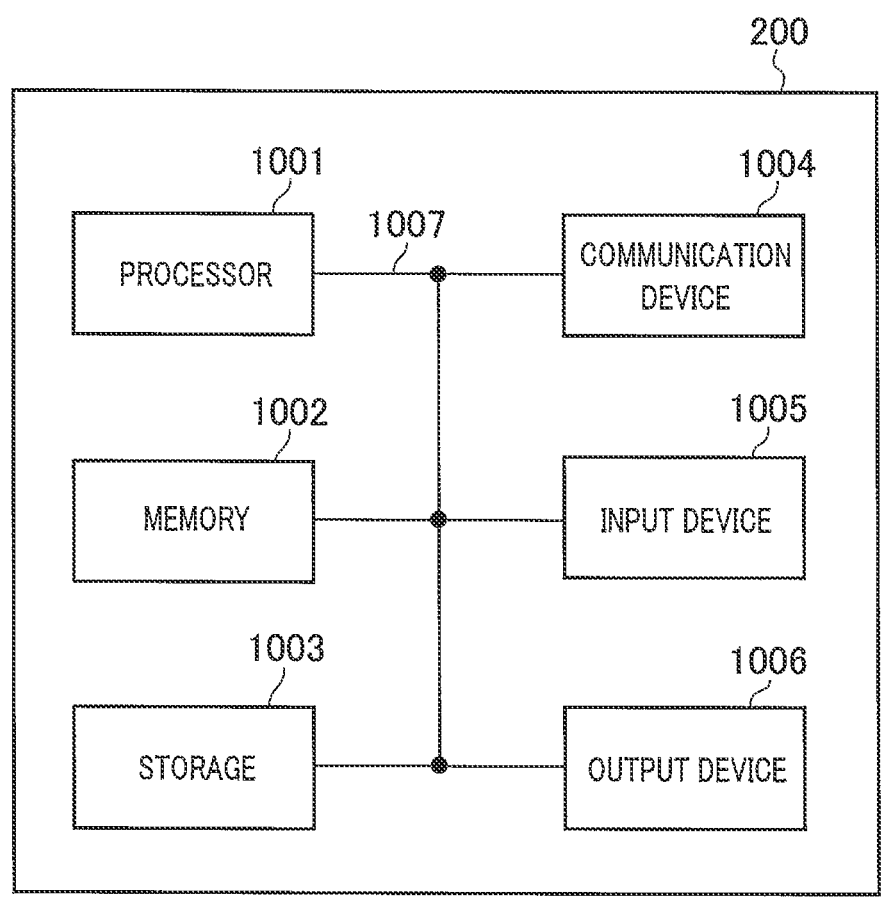
FIG. 19 is a diagram illustrating an example of hardware configuration of the UE 200.

Furthermore, the UE 200 (and gNB 100, hereinafter the same) explained above can function as a computer that performs the processing of the radio communication method of the present disclosure. FIG. 19 is a diagram showing an example of a hardware configuration of the UE 200. As shown in FIG. 19, the UE 200 can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

The functional blocks of the UE 200 (see FIG. 4) can be realized by any of hardware elements of the computer device or a desired combination of the hardware elements.

Moreover, the processor 1001 performs computing by loading a predetermined software (computer program) on hardware such as the processor 1001 and the memory 1002, and realizes various functions of the UE 200 by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main memory), and the like. The memory 1002 can store therein a computer program (computer program codes), software modules, and the like that can execute the method according to the embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling), notification information (Master Information Block (MIB), System Information Block (SIB)), other signals, or a combination of these). The RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station. A radio frame may be composed of one or more frames in the time domain. Each frame or frames in the time domain may be referred to as a subframe.

A subframe may be further configured by one or more slots in the time domain. The subframe may have a fixed time length (e.g., 1 ms) that does not depend on the numerology.

Numerology may be a communication parameter applied to at least one of transmission and reception of a certain signal or channel. The numerology can include one among, for example, subcarrier spacing (SubCarrier Spacing: SCS), bandwidth, symbol length, cyclic prefix length, transmission time interval (TTI), number of symbols per TTI, radio frame configuration, a specific filtering process performed by a transceiver in the frequency domain, a specific windowing process performed by a transceiver in the time domain, and the like.

The slot may be configured with one or a plurality of symbols (Orthogonal Frequency Division Multiplexing (OFDM)) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or more symbols in the time domain. A minislot may also be called a subslot. A minislot may be composed of fewer symbols than slots. PDSCH (or PUSCH) transmitted in a time unit larger than a minislot may be referred to as PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one between a subframe and TTI may be a subframe (1 ms) in existing LTE, or may be shorter than 1 ms (for example, 1 to 13 symbols), or a period longer than 1 ms. Note that, a unit representing TTI may be called a slot, a minislot, or the like instead of a subframe.

Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (that is, one or more slots or one or more minislots) may be the minimum scheduling unit. Further, the number of slots (the number of minislots) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and frequency domain, and may include one or a plurality of continuous subcarriers in the frequency domain. The number of subcarriers included in RB may be, for example, twelve, and the same regardless of the topology. The number of subcarriers included in the RB may be determined based on the neurology.

Also, the time domain of RB may include one or a plurality of symbols, and may have a length of 1 slot, 1 minislot, 1 subframe, or 1 TTI. Each TTI, subframe, etc. may be composed of one or more resource blocks.

Note that, one or more RBs may be called a physical resource block (Physical RB:PRB), a subcarrier group (Sub- Carrier Group:SCG), a resource element group (Resource Element Group:REG), PRB pair, RB pair, etc.

A resource block may be configured by one or a plurality of resource elements (Resource Element:RE). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, a common RB may be specified by RB index based on the common reference point of the carrier. PRB may be defined in BWP and numbered within that BWP.

BWP may include UL BWP (UL BWP) and DL BWP (DL BWP). One or a plurality of BWPs may be set in one carrier for the UE.

At least one of the configured BWPs may be active, and the UE may not expect to send and receive certain signals/channels outside the active BWP. Note that "cell", "carrier", and the like in this disclosure may be read as "BWP".

The above-described structures such as a radio frame, subframe, slot, minislot, and symbol are merely examples. For example, the number of subframes included in a radio frame, the number of slots per subframe or radio frame, the number of minislots included in a slot, the number of symbols and RBs included in a slot or minislot, the subcarriers included in RBs, and the number of symbols included in TTI, a symbol length, the cyclic prefix (CP) length, and the like can be changed in various manner.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each apparatus may be replaced with "unit", "circuit", "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

As used in this disclosure, the terms "determining" and "determining" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. In other words, "judgement" and "decision" may include considering some operation as "judged" and "decided". Moreover, "judgment (decision)" may be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
20 NG-RAN
100 gNB
200 UE
1001 Processor
1002 Memory
1003 Storage
1004 Communication device
1005 Input device
1006 Output device
1007 Bus

The invention claimed is:

1. A terminal comprising:
a processor that determines a target code rate by using a reference code rate, which is based on a modulation scheme and a modulation order, and determines an adjustment coefficient that reduces the reference code rate; and
a transceiver that transmits and receives signals encoded based on the target code rate,
wherein the transceiver transmits, to a network, capability information indicating whether or not it supports processing using the adjustment coefficient in both uplink and downlink transmissions.

2. A terminal comprising:
a processor that determines an adjustment coefficient and increases a frequency utilization efficiency by using the adjustment coefficient, while maintaining a reference code rate based on a modulation scheme and a modulation order; and a transceiver that transmits and receives signals with the increased frequency utilization efficiency, wherein the processor determines a size of a transport block by using the adjustment coefficient.

3. A terminal comprising:

a processor that determines an adjustment coefficient and increases a frequency utilization efficiency by using the adjustment coefficient, while maintaining a reference code rate based on a modulation scheme and a modulation order; and a transceiver that transmits and receives signals with the increased frequency utilization efficiency, wherein the transceiver transmits, to a network, capability information indicating whether or not it supports processing using the adjustment coefficient in both uplink and downlink transmissions.

* * * * *